(12) United States Patent
Stallfort et al.

(10) Patent No.: US 6,848,739 B2
(45) Date of Patent: Feb. 1, 2005

(54) MODULAR VEHICLE ROOF

(75) Inventors: Klaus Stallfort, Wehrheim (DE); Horst Schonebeck, Gelnhausen (DE)

(73) Assignee: ArvinMeritor GmbH, Dietzenback (DE)

( * ) Notice: Subject to any disclaimer, the term of this patent is extended or adjusted under 35 U.S.C. 154(b) by 0 days.

(21) Appl. No.: 10/321,992

(22) Filed: Dec. 17, 2002

(65) Prior Publication Data

US 2003/0122405 A1 Jul. 3, 2003

(30) Foreign Application Priority Data

Dec. 21, 2001 (DE) .......................................... 101 63 709

(51) Int. Cl.[7] .............................................. B62D 25/06
(52) U.S. Cl. ..................................................... 296/215
(58) Field of Search ........................ 296/146.15, 96.11, 296/93, 96.21, 215, 210

(56) References Cited

U.S. PATENT DOCUMENTS

| | | | |
|---|---|---|---|
| 5,520,434 A | * | 5/1996 | Paetz et al. ................. 296/215 |
| 6,086,138 A | * | 7/2000 | Xu et al. ................. 296/146.15 |
| 6,263,627 B1 | * | 7/2001 | Schonenbach et al. . 296/146.15 |
| 6,375,254 B1 | * | 4/2002 | Patz ........................... 296/215 |
| 6,409,258 B1 | * | 6/2002 | Grimm et al. .......... 296/216.08 |

FOREIGN PATENT DOCUMENTS

| | | |
|---|---|---|
| DE | 198 17 056 A1 | 10/1999 |
| DE | 198 52 383 A1 | 5/2000 |
| EP | 0 960 804 A2 | 12/1999 |

OTHER PUBLICATIONS

European Search Report dated Jun. 16, 2003.

* cited by examiner

Primary Examiner—Jason Morrow
(74) Attorney, Agent, or Firm—Carlson, Gaskey & Olds

(57) ABSTRACT

A modular vehicle roof, in particular motor vehicle roof, is proposed which has a strong outer roof skin as its outer shell and an inner shell of foamed plastics connected firmly thereto, preferably foamed thereon, in the manner of the sandwich. A preferably transparent panel of glass or plastics, which allows light to reach the vehicle interior, is inserted into the vehicle roof and attached and sealed thereto in a particular way, approximately flush with the outer surface. The modular vehicle roof is simple and economic to produce, is light and has only a small structural height.

19 Claims, 3 Drawing Sheets

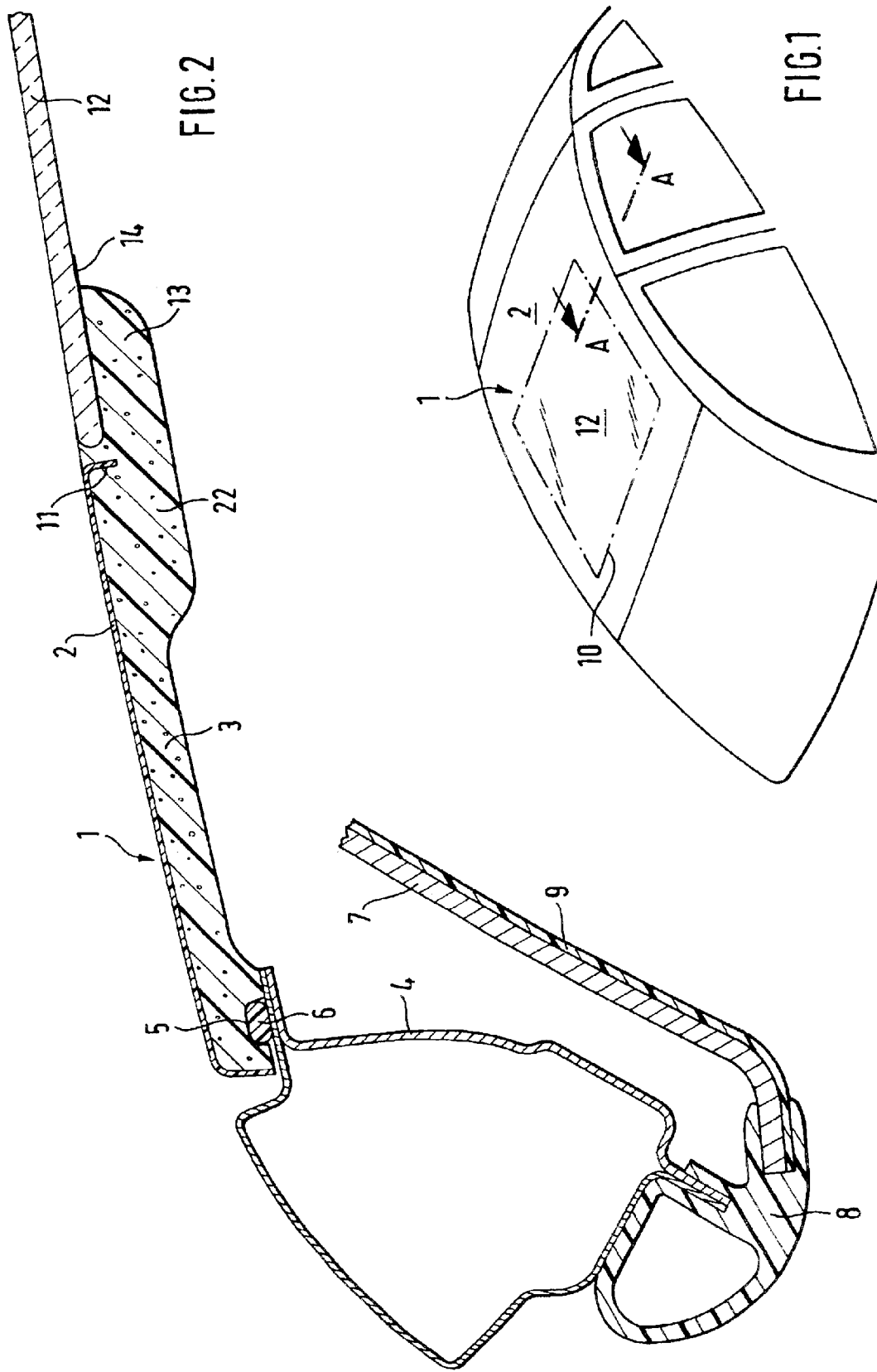

MODULAR VEHICLE ROOF

BACKGROUND OF THE INVENTION

The invention relates to a modular vehicle roof, in particular a motor vehicle roof, which is of sandwich-like construction, consisting of a strong outer roof skin with an outer shell and an inner shell connected firmly thereto and molded from foamed plastics, the outer roof skin defining an outer surface and the modular vehicle roof being produced separately from the vehicle bodywork, may be positioned with its outer edges on a bodywork frame and may be firmly connected therewith, and a roof opening being provided in the roof skin for light to enter the vehicle interior

DESCRIPTION OF THE PRIOR ART

Such modular, ready-to-install prefabricated vehicle roofs are produced separately from the vehicle bodywork and only connected to the vehicle bodywork on the assembly belt at the car factory. Owing in particular to the considerable reduction in assembly time on the assembly belt, such vehicle roof modules are becoming increasingly popular.

In one exemplary embodiment of such a known vehicle roof (DE 197 09 016 A1), a sliding cover of a preassembled sliding sunroof unit, constructed for example as a glass cover, is associated with an opening provided in the roof skin, which opening corresponds to an opening in the inner shell, such that even when the glass cover closes the roof opening light may reach the vehicle interior. However, a sliding sunroof unit, with its indisputable advantages, comprises inter alia a sliding sunroof frame, guide elements for the sliding cover and drive elements therefor, thereby making manufacture and assembly of the vehicle roof module a costly procedure. Moreover, a sliding sunroof unit increases the weight of the vehicle roof module and inevitably exhibits a considerable structural height, which either has to be added to the height of the vehicle interior necessary to provide the desired headroom for the vehicle occupants, which may increase the overall height of the vehicle bodywork to an undesirable degree, or reduces the height of the vehicle interior at the cost of headroom.

It has already been proposed (DE 100 15 504 A1) to reduce the manufacturing and assembly costs for a roof module with a roof skin made of plastics by incorporating the functional elements of a sliding sunroof unit into the roof skin. A surface of the roof skin, not described in any more detail, may be provided to the rear of the roof opening for the adjustable cover, which surface may be transparent in order to allow light to reach the vehicle interior in this area.

SUMMARY OF THE INVENTION

The object of the present invention is to provide a prefabricated modular vehicle roof of the above-indicated construction which is distinguished by relatively low production costs and is additionally of comparatively low weight and small structural height.

According to the present invention, there is provided a modular vehicle roof, in particular a motor vehicle roof, which is of sandwich-like construction, consisting of a strong outer roof skin with an outer shell and an inner shell connected firmly thereto and molded from foamed plastics, the outer roof skin defining an outer surface and the modular vehicle roof being produced separately from the vehicle bodywork, wherein the modular vehicle roof defines outer edges and may be positioned with its outer edges on a bodywork frame and may be firmly connected therewith, and a roof opening being provided in the roof skin for light to enter the vehicle interior; wherein a transparent panel is arranged inside the roof opening, the transparent panel having an outer surface which lies substantially flush with the outer surface of the roof skin and wherein the inner shell has a flange edge, projecting circumferentially into the roof opening, the outer surface of the transparent panel being firmly connected with the flange edge of the inner shell, thereby sealing a gap provided circumferentially between the outer circumference of the transparent panel and the circumferential edge of the roof opening.

The present modular vehicle roof may be produced in only a few working cycles and has a low weight and only a small structural height. Since the transparent panel is arranged fixedly in the roof module, it is not necessary to make allowances for slideability or displaceability within the roof opening when determining its geometric outer contours, such that a considerable latitude of design is available with regard to its outer contours and also its dimensions. The transparent panel may be conformed to all curvatures of the roof skin, such that there is no troublesome transition between the curvature of the transparent panel and that of the roof skin. Since the outer surfaces of roof skin and transparent panel lie approximately flush, there are also no troublesome steps marking the outer circumference of the panel. There is also no visible gap between the outer circumference of the transparent panel and the circumferential edge of the roof opening, because this gap is filled or closed in sealing manner.

The flange edge of the inner shell is preferably foamed onto the transparent panel, such that the outer roof skin and the transparent panel may be connected in the correct relative positions in one working cycle, the foaming process, in one and the same foaming mold. It is also expedient to coat the transparent panel in the area of the flange edge with an adhesion promoter, for example a primer layer applied by the silk-screen process, which at the same time makes the flange edge invisible from the outside.

The transparent panel may however alternatively also be bonded subsequently onto the flange edge of the inner shell, formed during the foaming process.

A plurality of advantageous options are available when it comes to sealed filling or closure of the gap provided circumferentially between the outer circumference of the transparent panel and the circumferential edge of the roof opening, which gap allows considerable manufacturing tolerances both with regard to the dimensions of the roof opening and the dimensions of the transparent panel. The simplest option provides for the gap in question to be back-filled with the foamed plastics of the inner shell. In this case, the gap is filled as early as during the foaming process, wherein it is merely necessary to ensure in the foaming mold that, between the outer surfaces of the roof skin and the transparent panel, the gap is bridged by the foamed plastics smoothly and without overlap.

However, closure of the gap may also be effected by foaming a T-shaped rubber profile into the gap, which overlaps both the circumferential edge of the roof opening and the outer circumference of the transparent panel, in each case adjoining them tightly. In this case, it is advantageous for the outer smoothness of the vehicle roof for the outer roof skin to be provided with a stepped depression around the circumference of the roof opening, which depression accommodates the rubber profile in the area where it overlaps the roof skin.

Finally, the gap may altogether also be filled and tightly closed by a resilient sealing profile fixed to the outer circumferential edge of the roof opening, which profile holds the outer circumference of the transparent panel from below by means of an edge strip. Such a resilient sealing profile is capable, like an edge gap seal on sliding sunroofs, not only of providing a reliable seal but also of effectively compensating manufacturing tolerances and differences in expansion between the transparent panel and the fixed or rigid outer roof skin, which may arise as a result of the materials used having different coefficients of expansion.

The flange edge of the inner shell, which supports the transparent panel, may advantageously be constructed on a thicker area of the inner shell surrounding the roof opening in the manner of a frame, whereby the modular vehicle roof simultaneously undergoes effective reinforcement. This may be further improved if metallic reinforcing profiles are foamed into the thicker area of the inner shell. These open up the advantageous possibility of constructing cup-type screw points on the reinforcing profile for attaching any shading elements or the like.

BRIEF DESCRIPTION OF THE DRAWINGS

For a better understanding of the invention and to show how the same may be carried into effect, reference will now be made, by way of example, to the accompanying drawings, in which:

FIG. 1 shows a schematic perspective view of A modular vehicle roof module already attached to a motor vehicle body, FIG. 2 is a broken-away section along section line A—A of FIG. 1 through a first embodiment of the vehicle roof module.

DESCRIPTION OF THE PREFERRED EMBODIMENTS

Figure 3:
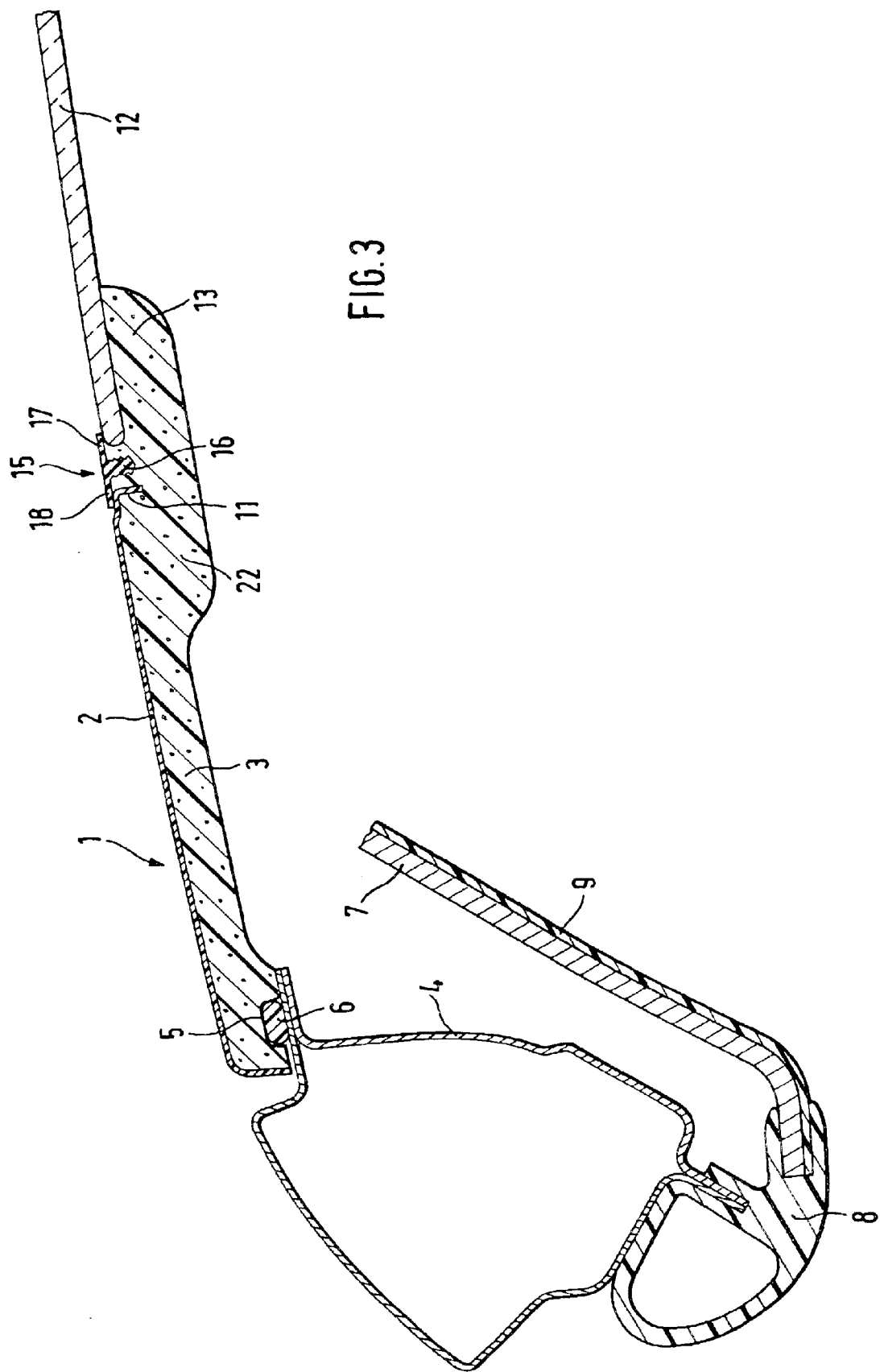
FIG. 3 is a broken-away section along section line A—A of FIG. 1 through a second embodiment of the vehicle roof module.

The modular vehicle roof 1 shown in the drawings consists, as will be explained in more detail below, of an outer shell or roof skin 2 made from a metallic material, e.g. sheet steel, or a plastics film and an inner shell 3 connected therewith in the manner of a sandwich, which inner shell 3 is made from a foamed plastics material, for example a PU-based rigid foam. The inner shell 3 is foamed onto the roof skin 2 in a foaming mold (not shown) for the purpose of firm connection. All the contours of the inner shell 3 are formed by appropriate shaping of the foaming mold. To increase strength prior to foaming-on, fibrous materials, for example glass fiber portions, may be incorporated in the foamed plastics. However, woven, knitted or nonwoven fabrics and the like placed in the foaming mold are also suitable as reinforcement.

The modular vehicle roof 1 may be positioned with its outer edges on a bodywork frame 4 and connected firmly therewith. To this end, a locating groove 5, open at the bottom, for an adhesive bead 6 is molded into the foamed plastics of the inner shell 3. The adhesive bead 6 not only attaches the vehicle roof 1 to the bodywork frame 4 but also seals the vehicle roof relative to the bodywork frame.

Figure 4:
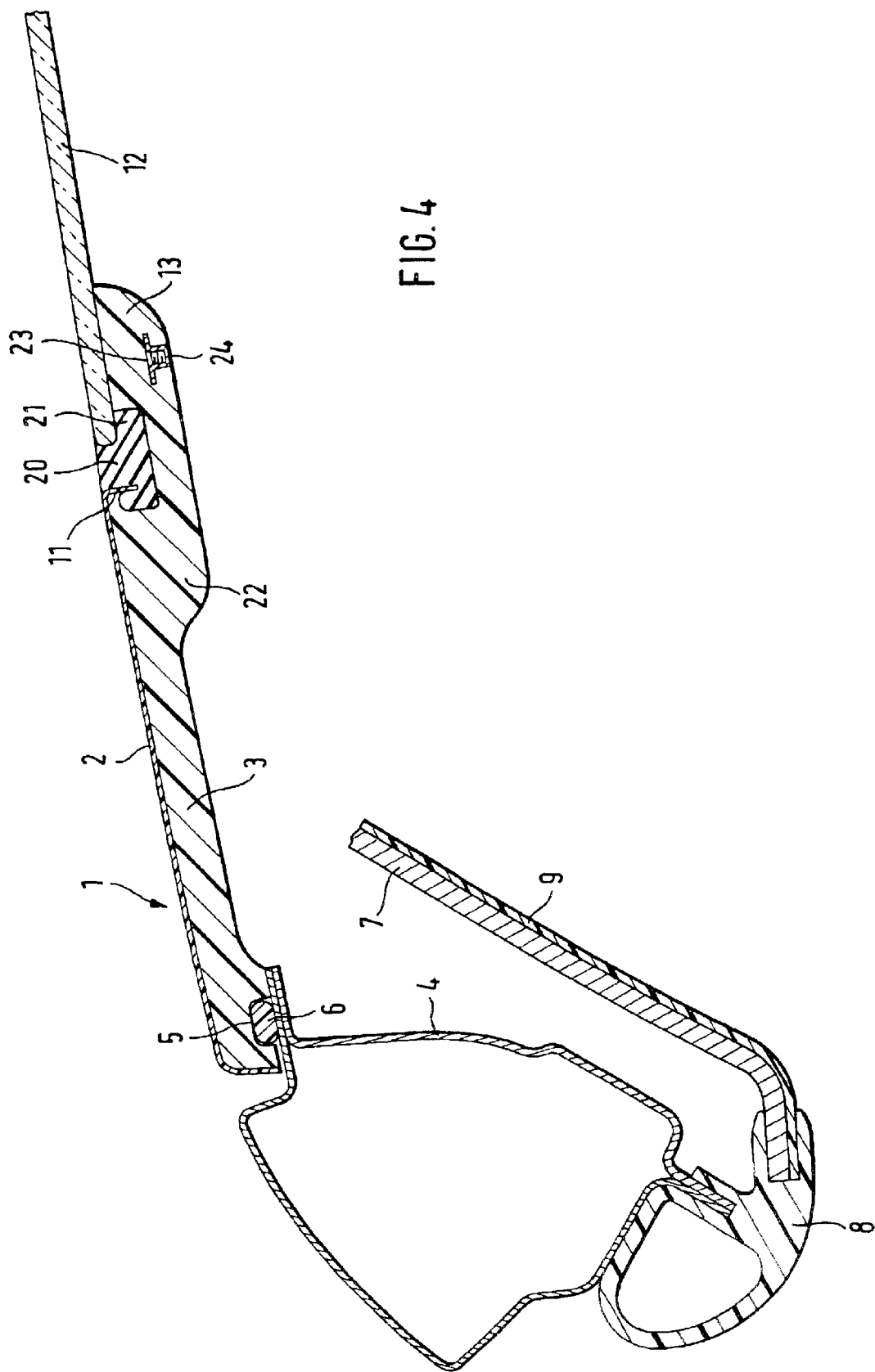
FIG. 4 is a broken-away section along section line A—A of FIG. 1 through a third embodiment of the vehicle roof module.

As is clear from FIGS. 2 to 4, a roof liner 7 shown broken away towards the top is provided which is connected with the bodywork frame 4 via a weatherstrip profile 8. The roof liner 7 may be a shell-shaped molded roof liner produced separately from the vehicle roof 1 or it may also be connected in one piece with the inner shell 3. One example of such a shell is described in DE 197 09 016 A1. The inner surface of the roof liner 7, i.e. its surface facing the interior of the vehicle, may be coated for decorative purposes with a textile or film-type covering material 9.

In the roof skin 2 there is located a roof opening 10, which is indicated in FIG. 1 by dash-dotted lines. In all the exemplary embodiments, the roof opening 10 is defined by a downwardly directed folded edge 11 surrounding the roof opening. Inside the roof opening 10 there is arranged a transparent panel 12 for allowing light to enter the vehicle interior, which panel preferably consists of transparent glass or a suitable transparent plastics and may be provided with a heat-insulating finish or coating also protecting against excessive UV radiation. The outer surface of the transparent panel 12 is approximately flush with the outer surface of the roof skin 2. Around the circumference of the roof opening 10 there projects a flange edge 13 of the inner shell 3, with which flange edge 13 the transparent panel 12 is firmly connected while sealing off a gap provided circumferentially between the outer circumference of the transparent panel 12 and the circumferential edge of the roof opening 10, i.e. the folded edge 11.

For the purpose of firm connection, the flange edge 13 of the inner shell 3 may be foamed onto the transparent panel 12, to which end the latter needs to be inserted in positioned manner into the foaming mold. To improve the connection, the transparent panel 12 may, as indicated only in FIG. 2, be provided in the area of the flange edge 13 with an adhesion-promoting coating 14, for example applied by a silk-screen printing process, which at the same time renders the flange edge 13 invisible from above. Alternatively, the transparent panel 12 may also be bonded to the flange edge 13 by means of a suitable adhesive.

In the exemplary embodiment illustrated in FIG. 2, the gap between the outer circumference of the transparent panel 12 and the circumferential edge of the roof opening 10, i.e. the folded edge 11, is back-filled with the foamed plastics of the inner shell 3. In this exemplary embodiment, therefore, the gap is closed during the foaming process.

In the exemplary embodiment illustrated in FIG. 3, on the other hand, a T-shaped rubber profile 15 is foamed circumferentially with its web strip 16 into the gap between the outer circumference of the transparent panel 12 and the circumferential edge of the roof opening 10, i.e. the folded edge 11, by means of the foamed plastics of the inner shell 3. The flange strip 17 of the rubber profile 15 overlaps the transparent panel, lying tightly against the outer circumference thereof, while the flange strip 18 of the rubber profile 15 overlaps the circumferential edge of the roof opening 10, lying tightly thereagainst. In order here to achieve a flush position for the flange strip 18, the outer roof skin 2 may be provided circumferentially around the circumferential edge of the roof opening 10 with a stepped depression 19 for flush accommodation of the flange strip 18.

In the exemplary embodiment shown in FIG. 4, the gap between the outer circumference of the transparent panel 12 and the circumferential edge of the roof opening 10, i.e. the folded edge 11, is closed circumferentially by a resilient sealing profile 20 fixed to the circumferential edge by attachment to the folded edge 11. The sealing profile 20, which may also take the form of a hollow chamber profile in the manner of the edge gap seals in sliding sunroof constructions, holds the outer circumference of the transparent panel 12 circumferentially from below by means of an edge strip 21.

The flange edge 13 of the inner shell is formed on a thicker area 22 of the inner shell 3 surrounding and reinforcing the roof opening in the manner of a frame. A metallic reinforcing profile 23 may be foamed into this thicker area 22 of the inner shell 3, as is shown only in FIG. 4 but may also be performed in the exemplary embodiments according to FIGS. 2 and 3. This reinforcing profile 23 may be provided with cup-type screw points 24 accessible from below, so as to be able to attach further elements of the modular vehicle roof, for example shading elements or the like, to the inner shell 3 by screwing-on.

Suitable materials for the roof skin 1 are sheet steels or sheets of aluminum alloys suitable for bodywork, which may be deep-drawn to form the roof skin 1. However, vacuum formable films of thermoplastics are also suitable therefor. Two-layer coextruded films may also be used, the outer layer of which consists for example of polymethyl methacrylate (PMMA) and the inner layer of which consists for example of a mixture of polycarbonate (PC) and acrylonitrile/styrene/acrylic acid ester copolymer (ASA).

In summary, a modular vehicle roof, in particular motor vehicle roof, is proposed which has a metallic outer roof skin as its outer shell and an inner shell of foamed plastics connected firmly thereto, preferably foamed thereon, in the manner of the sandwich. A preferably transparent panel of glass or plastics, which allows light to reach the vehicle interior, is inserted into the vehicle roof and attached and sealed thereto in a particular way, approximately flush with the outer surface. The modular vehicle roof is simple and economic to produce, is light and has only a small structural height.

We claim:

1. A vehicle roof assembly, comprising:
   an outer skin having an opening through the outer skin;
   a transparent panel aligned with the opening in the outer skin; and
   a plastic layer bonded to at least one side of the outer skin and having a flange portion sealingly connected with an outer edge of the transparent panel.

2. The roof assembly of claim 1, wherein the plastic layer comprises a foamed plastic secured to the outer skin.

3. The roof assembly of claim 2, wherein the flange portion of the foam plastic is foamed onto the edge of the transparent panel.

4. The roof assembly of claim 1, wherein the outer periphery of the transparent panel has a smaller dimension than an inner periphery of the outer skin opening and including a seal member extending between the outer periphery of the transparent panel and the inner periphery of the outer skin opening.

5. The roof assembly of claim 4, wherein the seal member comprises some of the plastic of the plastic layer.

6. The roof assembly of claim 4, wherein the seal member comprises a generally T-shaped rubber member having flange strips engaging corresponding portions of the outer skin and the transparent panel.

7. The roof assembly of claim 6, wherein the outer skin includes a depression near the edge of the opening and wherein the flange of the seal member is at least partially received onto the depression.

8. The roof assembly of claim 4, wherein the seal member comprises a first portion attached to the outer skin near the edge of the opening, a second portion extending between the inner periphery of the opening and the outer periphery of the transparent panel and a third portion engaging one side of the transparent panel near the peripheral edge of the panel.

9. The roof assembly of claim 8, wherein the flange portion of the plastic layer extends further toward a center of the transparent panel then the third portion of the seal member.

10. The roof assembly of claim 1, wherein the plastic layer has a first thickness across a portion of the plastic layer and a second, greater thickness at the flange portion.

11. The roof assembly of claim 1, including an adhesion promoter secured to at least a portion of the transparent panel that is secured to the plastic layer flange.

12. The roof assembly of claim 1, including a reinforcing profile supported by the plastic layer near an edge of the plastic layer flange, the reinforcing profile being adapted to support another member selectively connected to the reinforcing profile.

13. The roof assembly of claim 1, wherein the transparent panel is supported within the opening exclusively by the plastic layer.

14. The roof assembly of claim 1, wherein a portion of the plastic layer is coextensive with the side of the outer skin.

15. The roof assembly of claim 1, wherein the outer skin has a folded edge at the opening and wherein the edge is surrounded by the plastic layer.

16. The roof assembly of claim 1, wherein there is no overlap between the outer skin and the transparent panel.

17. A vehicle roof assembly, comprising:
    an outer skin having an opening through the outer skin;
    a transparent panel aligned with the opening in the outer skin; and
    a plastic layer secured to at least one side of the outer skin and having a flange portion sealingly connected with an outer edge of the transparent panel, the plastic layer securing the outer skin and the transparent panel together such that the transparent panel is maintained within the opening.

18. The roof assembly of claim 17, wherein the plastic layer is foamed onto the side of the outer skin and the outer edge of the transparent panel.

19. The roof assembly of claim 17, wherein at least a portion of the plastic layer is bonded to and coextensive with the side of the outer skin.

* * * * *

UNITED STATES PATENT AND TRADEMARK OFFICE
CERTIFICATE OF CORRECTION

PATENT NO. : 6,848,739 B2
DATED : February 1, 2005
INVENTOR(S) : Stallfort et al.

It is certified that error appears in the above-identified patent and that said Letters Patent is hereby corrected as shown below:

<u>Title page,</u>
Item [73], Assignee, should read as -- ArvinMeritor GmbH, Dietzenbach (DE) --

Signed and Sealed this

Third Day of May, 2005

JON W. DUDAS
*Director of the United States Patent and Trademark Office*